United States Patent Office 2,823,218
Patented Feb. 11, 1958

2,823,218

PROCESS FOR THE PRODUCTION OF ORGANO-SILICON COMPOUNDS

John L. Speier, Pittsburgh, Pa., and Donald E. Hook, Midland, Mich., assignors to Dow Corning Corporation, Midland, Mich., a corporation of Michigan No Drawing. Application December 5, 1955
Serial No. 550,831

9 Claims. (Cl. 260—448.2)

The present invention relates to an improved process for bringing about the reaction of a compound containing a silicon bonded hydrogen atom with a compound containing aliphatic unsaturation to establish a new Si—C bond.

It is a well-known fact in the field of organosilicon chemistry that silicon compounds containing a silicon bonded H atom may be reacted with certain compounds containing ethylenic or acetylenic linkages. The reaction proceeds by the addition of the silicon-hydrogen bond across a pair of aliphatic carbon atoms linked by multiple bonds, i. e., C=C or C≡C. An illustration of the general reaction is as follows:

With some reactants the reaction proceeds without catalysts. The required reaction temperatures are relatively high, however, and yields of product are inclined to be low, with accompanying by-production of unwanted compounds. To avoid some of these problems, various catalysts have been proposed, e. g. organic peroxides and metals such as palladium and platinum. Of these, the latter has been preferred, and its use in the form of platinum black, platinized silica gel, platinized asbestos, and platinized charcoal has been suggested. In actual practice, only the latter form is usually found to have much effect on or value in the general reaction.

The catalyst composed of platinum supported on charcoal has been found to have definite limitations in the reaction in question, however. Some reactions which theoretically should proceed in the expected manner do not do so at any temperature below the decomposition temperature of the reactants. With certain other reactants this catalyst leaves much to be desired in regard to yields of products obtained or in the related problem of by-production of unwanted compounds. In yet other instances, the objection to this catalyst lies in purely mechanical difficulties encountered in its use. For example, some reactants within the scope of the general reaction lead to resinous products from which it is difficult if not impossible to remove the undesired charcoal catalyst particles.

It is an object of the present invention to provide an improved process for the reaction of a silicon compound containing a silicon linked H atom with a compound containing aliphatic unsaturation, to provide increased yields of products and decreased yields of by-products from such reactions, and to lower the reaction temperature necessary for the reaction to take place. Another object is to extend the reaction in question to reactants which have hitherto failed to react in the expected or desired manner. A further object is to improve the mechanical ease of conducting the reaction and of handling the products thereof. Further objects and advantages will be apparent from the following specification.

It has been found that the above objects can be accomplished by conducting the described reaction in the presence of chloroplatinic acid as a catalyst. Thus, this invention relates specifically to a process for the production of organosilicon compounds containing the carbon to silicon bond comprising contacting a silicon compound containing at least one H atom linked to Si per molecule, there being not more than two H atoms attached to any one Si atom, with a compound containing aliphatic carbon atoms linked by multiple bonds in the presence of chloroplatinic acid.

Chloroplatinic acid is also known as "platinic chloride" or "acid platinic chloride." It is a commercially available material, and its preferred and most available form is as the hexahydrate, i. e., $H_2PtCl_6 \cdot 6H_2O$. This is a crystalline material which can be used in this invention either in its pure form or as a solution. It is readily soluble in polar solvents, e. g. alcohols, water, and various glycols and esters. For ease of handling and measuring the relatively minute amounts needed herein, the use of a solution of the catalyst is preferred. Since only small amounts are required, the possible reactivity of the solvent with one of the reactants is of no particular importance.

An anhydrous form of the catalyst can be employed if desired. Such forms can be prepared, e. g., by dehydrating the hexahydrate at very low pressures. Elevated temperatures are to be avoided in the dehydration, however, as there is considerable danger of causing some decomposition of the acid from such a process. Since no particular advantage is gained by using the anhydrous product, the hexahydrate itself is preferred, and it is the latter form which is referred to in this specification except where otherwise indicated.

Any silicon compound containing at least one H atom linked to silicon per molecule can be used in this invention, as long as there are no more than two H atoms attached to any one Si atom. Thus this particular reactant can be a monomer, a polymer, a copolymer, or any mixture of any of these materials. This reactant can be entirely inorganic, such as $HSiCl_3$ and $H_2SiBr_2$, or it can contain organic substituents, e. g. $RSiH_2Cl$ and $R_2SiHCl$. Any organic substituents present are not necessarily linked directly to the Si by Si—C bonds, thus compounds such as $HSi(OR')_3$, $HSi(OR')Cl_2$, $RHSi(OR')(OOCR')$ and $HSi(OOCR')_3$ are suitable. Comparable amino and imino silanes have been suggested in the literature as suitable for this general "olefinic" addition reaction.

When a polymeric silicon compound is employed, it can be, e. g., a polysilane, a polysiloxane, a polysilcarbane (characterized for example, by a —$SiCH_2Si$— or —$SiC_6H_4Si$— type of structure), a silazane (characterized by an Si—N—Si type of structure), or any polymers of such polymeric units with other like or unlike units or with purely organic units. The term "polymer" as herein employed is intended to include both dimers and copolymers.

Examples of suitable polymers (and copolymers include $Cl_2HSiSiHCl_2$, $R_2HSiSiBr_3$, $R_2HSiOSiR_2H$, $$(RHSiO)_a$$

where $a$ is an integer of 3 or more, $R_3SiCH_2CH_2SiHCl_2$, $R_3SiC_6H_4SiH_2OR$, $R_3SiO(RHSiO)_bSiR_3$ where $b$ is any integer, and copolymers containing any one or more of the units $R_3SiO_{.5}$, $R_2SiO$, $RSiO_{1.5}$ or $SiO_2$ along with at least one unit per molecule of the formula $RHSiO$, $R_2HSiO_{.5}$, $HSiO_{1.5}$, $H_2SiO$, or $RH_2SiO_{.5}$.

In all of the preceding formulas R and R' can be any organic radicals and each can represent the same or different radicals in any particular molecule, but they are preferably monovalent hydrocarbon radicals or halogenated derivatives thereof. Particularly preferred species are alkyl, such as methyl, ethyl, and octadecyl, cycloalkyl such as cyclohexyl, aryl such as phenyl, aralkyl such as benzyl, alkaryl such as tolyl, and haloaryl such as mono- or dichlorophenyl. The most preferred species are those in which R is methyl and/or phenyl. R can also be an unsaturated aliphatic radical such as vinyl and allyl, including unsaturated alicyclic radicals such as cyclohexenyl, all of which lead to the ability of the Si—H containing compound to react with itself, as is discussed later.

The preferred Si—H containing compounds are those having the general formula $R_xSiH_zY_{4-x-z}$ and hydrolysis products thereof. In this formula R is as above defined, Y is selected from the group consisting of halogen atoms, —OR', and —OOCR' radicals where R' is as above defined, $x$ has a value of from 0 to 2 inclusive, and $z$ has a value of from 1 to 2 inclusive. Fractional values for $x$ and $z$ can of course be obtained by employing a mixture of compounds each of which is within the scope of the formula.

The "hydrolysis products thereof" referred to are inclusive of (1) cohydrolysis products formed by mixing other hydrolyzable silanes with the defined silane prior to hydrolysis, (2) products formed by the hydrolysis of the defined silane or silanes alone, and (3) copolymers formed by copolymerizing (2) with the hydrolysis product of some other hydrolyzable silane. For example, $CH_3SiHCl_2$ can be hydrolyzed to produce polymers containing $CH_3HSiO$ units, or $CH_3SiHCl_2$ and $(CH_3)_2SiCl_2$ can be cohydrolyzed to produce a copolymer containing both $CH_3HSiO$ and $(CH_3)_2SiO$ units, or the latter two units can be prepared individually and the products copolymerized, e. g., with an acid catalyst. The presence of any substantial amount of alkaline catalyst during hydrolysis or polymerization is to be avoided, because the Si—H bond is easily ruptured by such catalysts, and the "hydrolysis product" employed in this invention must retain at least one H atom linked to Si per molecule.

The hydrolysis products described above and techniques for their manufacture are well known to the art. If the hydrolysis products in question are prepared from the defined preferred silanes, it can be seen that they will contain at least one polymeric unit of the formula $$R_xSiH_zY_yO_{\frac{4-x-y-z}{2}}$$

per molecule, where R, Y, $x$, and $z$ are as above defined, $y$ is an integer of from 0 to 2 inclusive, and the sum of $x+y+z$ has a value less than 4. Preferably at least 1 molar percent of the units in any copolymer employed will be of this type. Obviously if the hydrolysis is complete, $y$ will equal 0, but if the hydrolysis is only partial, $y$ will be 1 or 2. Any copolymer employed can be composed of more than one type of unit of the above formula, or one or more of such units can be part of a copolymer in which the remaining units have the general formula $R_3SiO_{.5}$, $R_2SiO$, $RSiO_{1.5}$, or $SiO_2$, in any desired ratio or combination where R is as above defined. As is well known in organosilicon chemistry, the latter units also may contain unhydrolyzed substituents such as the Y substituents discussed above, and/or uncondensed OH groups, attached to the Si atoms herein. These latter units would fall within the general formula $$R_dSiZ_yO_{\frac{4-d-y}{2}}$$

where R is as above defined, Z is halogen, —OR', —OOCR', or OH, R' being as above defined; $d$ is an integer of from 0 to 3 inclusive, $y$ is an integer of from 0 to 2 inclusive, and the sum of $d+y$ has a value of from 0 to 3 inclusive.

Specific compounds illustrative of the Si-H containing reactants which can be used herein are as follows (for simplicity, the symbols Me, Et, Ph, Vi, and Ac are used hereinafter to designate methyl, ethyl, phenyl, vinyl, and acetyl respectively): $HSiCl_3$, $EtHSiBr_2$, $PhHSiF_2$, $Vi_2HSiCl$, $Me_2HSiI$, $H_2SiBr_2$, $Me_2HSiSiHCl_2$, $HSi(OEt)_3$, $EtHSi(OEt)Cl$, $HSi(OAc)_3$, $Me_3SiCH_2SiHCl_2$, $$Cl_2HSiC_6H_4SiHCl_2$$

$Me_3SiOSiMe_2H$, $Me_3SiO(MeHSiO)_bSiMe_3$ where $b$ is any integer, $Me_3SiO(Me_2SiO)_b(MeHSiO)_cSiMe_3$ where $b$ and $c$ are any integers, $(MeHSiO)_a$ where $a$ is any integer of 3 or more, $Me_2HSiOOCC_4H_9$, $Cl_2C_6H_3SiHCl_2$, $C_{18}H_{37}SiHF_2$, copolymers of $Me_2SiO$ and $MeHSiO$ units only, copolymers of $MeSiO_{1.5}$, $PhSiO_{1.5}$, $PhMeSiO$, and $HSiO_{1.5}$ units, and copolymers of $Ph_2SiO$, $MeSiO_{1.5}$, $SiO_2$, and $MeHSiO$ units.

The most preferred polymeric reactants of the above type are those which contain at least one polymeric unit of the formula $$(CH_3)_qHSiO_{\frac{3-q}{2}}$$

per molecule, where $q$ is an integer of from 0 to 1 inclusive.

The Si—H containing silicon compounds described above are reacted with any unsaturated compound containing at least one pair of aliphatic carbon atoms linked by multiple bonds, i. e., any compound containing ethylenic or acetylenic linkages, or with any mixture of such compounds. This unsaturated compound can be a truly organic compound, or it can be a type of organic compound which one might refer to more specifically as an organometallic compound, e. g. an organosilicon compound, or it may be an organic salt, or an organic ester of an inorganic acid. The only requirement that is absolutely essential in this unsaturated compound is that it contain one or more ethylenic or acetylenic linkages in an aliphatic portion of the molecule. The presence of other substituents in the molecule, whether they be functional or entirely inert, does not prohibit the reaction.

It is preferable, but not essential, that the unsaturated reactant be free of hydrogen substituted carbonyl (HC=O) groups. It has been found that the presence of such aldehyde type groups reduces the Si—H containing reactant and leads to polymeric products. Thus, although a new carbon-silicon bond is produced, the product is not the corresponding aldehyde substituted silicon compound. In other words, the reaction takes the following exemplary form:

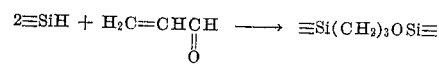

The location of the aliphatic multiple bond in this reactant is not material, for both terminal and non-terminal unsaturation are operative. Also the reaction proceeds regardless of whether the reactant is a straight chain, branched chain, or alicyclic type of compound. The presence of aromatic unsaturation in the compound does not negate the reactivity of the required aliphatic unsaturation.

The reaction is more easily studied and analyzed when the unsaturated compound is a relatively simple hydrocarbon, a relatively simple ester of an unsaturated carboxylic acid or of an unsaturated alcohol and a saturated carboxylic acid, or a halogenated hydrocarbon. For this reason a large portion of the present specification will be devoted to such compounds. It is to be understood, however, that the invention is by no means limited to the reactants whose reaction products can be analyzed and characterized.

The unsaturated hydrocarbons are all applicable to this invention. As a practical matter the preferred upper limit of molecular weight is in the region of 30 carbon atoms. Thus ethylene, propylene, pentene, octene, cetene ($C_{16}$), octadecylene, cerotene ($C_{26}$) and melene ($C_{30}$) are illustrative reactants, along with mixed alkenes obtained, e. g., by cracking a petroleum rich in alkanes. The comparable acetylene series is also suitable, e. g., acetylene, butyne-1, heptyne-1, and dodecyne-1.

The hydrocarbon can be branched chain, as for example, unsym-methylethylethylene, isobutylene, and 3-methylbutyne-1. The muliple bond is not necessarily a terminal one, and reactants such as pentene-2, 2-methylbutene-2, and pentyne-2 are suitable. The compounds containing non-terminal unsaturation are particularly illustrative of those which failed to react satisfactorily when the previously known catalysts were employed.

The reactants are not restricted to those containing only a single pair of carbon atoms having multiple bonds. Thus the diolefins, for example butadiene-1,3 and its homologues; allene ($CH_2=C=CH_2$) and its homologues; pentadiene, isoprene and methylisoprene; the alkenynes such as vinylacetylene and divinylacetylene; and the alkadiynes such as diacetylene, dipropargyl $$(HC\equiv CCH_2CH_2C\equiv CH)$$

and hexadiyne-2,4 can be employed if desired. Of course many of the latter types of reactants are dangerous to handle, some even forming solid polymerization products which are violently explosive, and for this reason they can only be used with the utmost caution.

It is to be understood that the defined aliphatic nature of the unsaturation does not exclude the alicyclics. Cyclopentene, cyclohexene, laurolene (1,2,3,-Me$_3$-cyclopentene) and cyclopentadiene are illustrative of suitable reactants. The alicyclics are further representative of unsaturates which failed to undergo the desired reaction to any appreciable degree prior to the present invention.

The aliphatic unsaturation is also operative in the desired reaction when coupled with an aromatic nucleus. Thus styrene, divinylbenzene, allylbenzene, phenylbutadiene, and phenylacetylene are entirely suitable reacants in the present invention, along with compounds such as indene and stilbene.

The various unsaturates of the type discussed above remain reactive in the present invention even when non-hydrocarbon substituents are introduced. Along with the hydrocarbons themselves, those which contain halogen, oxygen (in the form of acids, anhydrides, alcohols, esters, and ethers), nitrogen, and metals (particularly silicon, titanium, zirconium, phosphorus, germanium, tin, and boron) lead to the most commercially important products as viewed at the present time.

The unsaturated halogenated hydrocarbons which may be used herein are exemplified by compounds such as vinyl chloride, allyl bromide, allyl iodide, allylene bromide, tri- and tetrachloroethylene, tetrafluoroethylene, chloroprene, propargyl chloride, vinylidene chloride, and dichlorostyrene.

Other examples of reactants which may be used which contain more than just the carbon, hydrogen, and halogen found in the reactants discussed above are the heterocyclic compounds. Thus compounds containing unsaturated carbon pairs in a ring with nitrogen or oxygen, for example, can be employed. Indole, dihydrofuran, and indigo are typical of such compounds. Thiophene and its derivatives may also be used. Quinone and furan have been suggested in the literature as further examples of suitable reactants in the Si—H addition reaction. It is to be understood that the above comments about the suitability of various elements being present in heterocyclic ring structures are by no means intended to imply that such elements should be excluded from the scope of the reactants if present in other forms. As an example, the cyanides, such as allyl cyanide, are completely suitable herein. Nitriles, nitro compounds, ketones and the like have been suggested in the literature as reactants in this type of reaction.

Suitable oxygen containing reactants are also exemplified by ethers such as the allyl and vinyl ethers, alcohols such as allyl alcohol (vinyl carbinol), methyl-vinylcarbinol and ethynyldimethylcarbinol, acids such as acrylic, methacrylic, vinylacetic, oleic, sorbic, linolenic, and chaulmoogric, and esters in which either the alcoholic or acid radicals, or both, contain the required unsaturation.

Because of their many resin-forming possibilities, the unsaturated esters are of particular importance in forming silicon modified products according to this invention. As with the hydrocarbons discussed above, the esters can be straight chain, branched chain, or alicyclic in either the acidic or alcoholic radical, and the position of the multiple bond can be terminal or otherwise. Examples of esters of saturated alcohols and unsaturated acids which have been employed successfully are as follows: methylacrylate (straight chain), methylmethacrylate (branched chain), methylcisbicyclo [2.2.1]hept-5ene-2 carboxylate (alicyclic), and ethylcrotonate (non-terminal C=C). An example of a suitable ester reactant containing unsaturation in both the alcoholic and acidic portions of the molecule is allylmethacrylate. Suitable esters prepared from unsaturated alcohols and saturated acids are, e. g., vinyl acetate, allyl acetate, butenyl acetate, and allyl stearate. Polyesters may also be used, as for example, diallyl succinate or glutarate, methylene malonic ester, diallyl phthalate, and diallyl maleate.

Another type of unsaturated reactant of great commercial interest in the present invention is that represented by organometallic compounds in which the organic group contains the defined unsaturation. Organosilicon compounds within this definition are particularly important. Any of such compounds can be used, whether they are monomers, polymers, copolymers, or mixtures, as long as the requisite organic substituent containing aliphatic carbon atoms linked by multiple bonds is present. Thus the organic substituent itself in this organometalic unsaturated reactant can be any of the radicals derived from any of the truly organic unsaturated compounds discussed above which are capable of forming organometallic compounds. Of course other organic or inorganic substituents can also be present along with the required unsaturated organic substituent.

In regard to unsaturated organosilicon reactants falling within this definition, it can be seen that they can be the same as any of the Si—H containing reactants discussed previously except that the H atom is not necessarily present and an unsaturated organic radical of the defined type must be present. Thus silanes, disilanes, polysilanes, siloxanes, silcarbanes, silazanes, and copolymers of any of these are all applicable if they contain the defined type of unsaturated organic radical, regardless of any other substituents which may be present.

The preferred organosilicon reactants within the scope of the unsaturated reactants are monomers of the general formula $R''_e SiV_{4-e}$, and polymers containing at least one polymeric unit of the formula $$R''_f V_e SiO_{\frac{4-f-g}{2}}$$

per molecule. The latter polymers can of course be copolymers, and can include any amount of polymeric units of the formula $$R_d SiV_y O_{\frac{4-d-y}{2}}$$

where R, d, and y are as previously defined and the sum of $d+y$ has a value of from 0 to 3 inclusive. Preferably any copolymer employed contains at least 0.01 molar percent of the former units and best results are obtained if there is at least 1 molar percent of such units. In the above formulas e has a value of from 1 to 4 inclusive, f of from 1 to 3 inclusive, g of from 0 to 2 inclusive, the sum of $f+g$ having a value of from 1 to 3 inclusive, V is selected from the group consisting of R, —OR', and —OOCR' radicals (where R and R' are as previously defined), halogen atoms, and hydrogen atoms, and R'' is an organic radical containing aliphatic carbon atoms linked by multiple bonds. Preferably R'' is an alkenyl or cycloalkenyl radical. Where more than one R, R', R'' or V radical is present per molecule, each can represent the same or different radicals within the scope of their respective definitions.

Examples of preferred monomeric reactants within the scope of the above formula are $ViSi(OEt)_3$, $ViMeSiCl_2$, $Vi_4Si$, $ViHSiPh_2$, $Vi_2Si(OOCMe)Cl$, cyclohexenyltriethylsilane, and octadecenylmethyldichlorosilane. Examples of preferred polymers are those containing such units as $ViSiO_{1.5}$, $Vi_2SiO$, $Vi_3SiO_{.5}$, $ViHSiO$, $ViMeSiO$, $ViMe_2SiO_{.5}$, $Vi_2MeSiO_{.5}$, $ViPhSiO$, $ViPh_2SiO_{.5}$, $Vi_2PhSiO_{.5}$, $ViPhMeSiO_{.5}$, $ViEtSiO$, $ViSi(OEt)O$, $ViSi(Cl)O$, $ViSi(OOCMe)O$, allyloctadecylsiloxane, and cyclohexenyl(dichlorophenyl)siloxane. Examples of preferred copolymers are those consisting of any two or more of the indicated polymeric units, or any one or more of the indicated units along with any one or more of the following units: $MeSiO_{1.5}$, $Me_2SiO$, $Me_3SiO_{.5}$, $PhSiO_{1.5}$, $Ph_2SiO$, $PhMeSiO$, $PhMe_2SiO_{.5}$, $Ph_2MeSiO_{.5}$, $MeHSiO$, $Cl_2C_6H_3SiO_{1.5}$, $PhEtSiO$, $C_{18}H_{37}SiO_{1.5}$, $MeSi(OEt)O$, $PhMeSi(Cl)O_{.5}$, $MeSi(OOCMe)O$.

The preparation of organosilicon monomers, polymers, and copolymers has been amply described in the literature and a large number are commercially available. Those polymers or copolymers in which at least some of the "V" radicals are hydrolyzable radicals can be prepared, as is known, by the partial hydrolysis of the corresponding monomer or mixture of monomers.

It will be seen that those unsaturated monomers, polymers, or copolymers discussed above which also contain Si bonded H atoms can be a single reactant in the invention, i. e. they can react with themselves. As an example, the compound $ViHSiPh_2$ reacts with itself in the process of this invention to produce cyclic polymers of the unit formula

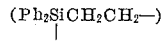
$$(Ph_2SiCH_2CH_2-)$$

The preferred unsaturated organosilicon reactants discussed above have the unsaturated organic radical attached directly to silicon by C—Si linkage. This direct attachment is by no means necessary, however. For example, compounds such as the various allyloxysilanes and siloxanes (either with or without other organic substitution) are operative.

As has been indicated previously, other organometallic compounds can alsdo be employed herein when they contain the defined unsaturated organic radical. As with the silicon compounds, the organic radical can be attached directly to the metal atom where such is possible, or it can be linked to the metal through an intermediate element, preferably oxygen. Examples of the latter type of compounds which can be used are the so-called titanates and zirconates, e. g. diethoxydiallyloxytitanium, tri(2-ethyl-hexyloxy)-allyloxytitanium, and triethoxyallyloxyzirconium. Appropriately substituted phosphorus compounds, e. g. phosphates and phosphonates, can be used in this invention as a means of obtaining compounds containing both silicon and phosphorous.

As is indicated from the phosphates, etc., mentioned above, the metal-containing unsaturated reactants do not necessarily fall within the definition of "organometallic" compounds. Metallic atoms can be present in the reactants in other forms, as for example in the alkali metal salts of unsaturated organic acids or of siloxanes containing the defined unsaturated organic substitution. Sodium and potassium salts of such compounds are preferred.

The suitability of the various unsaturated hydrocarbon monomers and substituted unsaturated hydrocarbon monomers as reactants in this invention has been discussed above. It is to be understood that polymers, copolymers, and resins containing the defined type of unsaturation are also applicable. Thus a host of natural and synthetic polymeric or resinous materials can be used as the unsaturated reactant, as long as they retain a residual aliphatic unsaturation in their polymerized or partly polymerized form. Typical of such reactants are rubber, balata, and guttapercha; the rubber-like polymers and copolymers of butadiene, isoprene, chloroprene, styrene, pentadiene, etc.; incompletely polymerized and/or copolymerized forms of styrene, divinylbenzene, and the like; the polyester resins such as those of the acrylates and methacrylates, and the various drying oil resins, e. g. oil modified alkyd resins wherein the modifying agent is linseed oil, tung oil, soya bean oil, and the like.

In order to simplify the nature of the reaction product and gain a maximum degree of control over the course of the reaction, it is preferable to employ an unsaturated compound in which the unsaturation is itself the only source of reactivity with whatever Si—H containing compound is being used. This does not preclude the use of reactants which are reactive toward one another in more than this respect, however. For example, if a compound such as $MeHSiCl_2$ or $HSiCl_3$ is employed as the source of Si—H, a relatively straight-forward reaction and easily isolated product is obtained by employing unsaturated reactants such as alkenes, alkynes, cycloalkenes, halogenated derivatives of any of these, or the relatively simple unsaturated esters. If an unsaturated alcohol is employed instead, it is readily seen that a competing alcoholysis reaction will take place. In the latter case the reaction of this invention will still proceed, but the reactants will no longer be those introduced. In the illustrative case given, for example, the formed unsaturated alkoxyhydrogenmethylsilane or alkoxyhydrogensilane would proceed to react with itself, as well as with any unreacted chlorosilane remaining in the system. In general this problem does not arise when a siloxane is used as the source of Si—H, for the siloxanes are relatively inert to any extraneous substituents in the unsaturated reactant.

The relative amounts of Si—H containing reactants and unsaturated reactants employed in the process herein have no technical limitations whatsoever. One ethylenic linkage is obviously the theoretical equivalent of one silicon bonded hydrogen atom, and one acetylenic linkage requires two hydrogen atoms to achieve saturation. However there is no absolute necessity for equivalent amounts of the reactants to be employed, and any desired excess of either reactant can be present. In fact an excess of one reactant may often be desirable to force the reaction to completion, or to make the greatest possible use of the reactant which is the most expensive or most rare. Thus the choice of reactant ratios is mostly a matter of practicality and economics, based upon the particular reactants employed.

It is to be understood that achieving a state of saturation in the final product may be often desirable but is by no means always so. An unsaturated product can be obtained by choosing an acetylenic reactant or, where polymeric unsaturated reactants are concerned, by employing an excess of the unsaturated reactant. Ordinarily it is preferred in this invention to use a reactant ratio ranging from 1:20 to 20:1 in terms of equivalents of Si—H compound to unsaturated compound, the more usual operating range being in the region of from 1:2 to 2:1.

In regard to the amount of catalyst employed, the maximum amount is determined only by economical considerations and the minimum amount by the type and purity of reactants employed. Very low concentrations of catalyst, e. g. as low as about $1 \times 10^{-10}$ moles catalyst per equivalent of the unsaturated compound, may be used when the reactants are extremely pure. Many ordinary reactants, however, contain an unknown impurity or impurities which apparently "poison" low concentrations of catalyst and render it partially inoperative, hence it is preferable to use at least about $1 \times 10^{-8}$ moles catalyst per equivalent weight of unsaturated compound. The best results have been obtained by employing from $1 \times 10^{-7}$ to $1 \times 10^{-3}$ moles catalyst per equivalent weight of unsaturated compound.

It is to be understood that "moles" of the catalyst are measured in terms of 1 mole providing 1 unit atom (e. g. 1 gram atom) of Pt. An "equivalent weight" of the unsaturated compound is used herein to designate the amount of reactant which furnishes 1 unit weight of ethylenic unsaturation or ½ unit weight of acetylenic unsaturation (i. e. equivalent to one unit weight of Si—H) regardless of whatever other reactive or potentially reactive substituents may be present. Thus an equivalent weight of ethylene is its molecular weight but an equivalent weight of acetylene or of a monomeric diolefin would be ½ of the molecular weight. The equivalent weight of an unsaturated polymeric reactant is the average weight required to furnish 1 unit weight of ethylenic unsaturation or ½ unit weight of acetylenic unsaturation. Thus, for example, a copolymer of $Me_2SiO$ units and $MeViSiO$ units in an equimolar ratio is considered to have an equivalent weight of $(74+86)/2=80$, regardless of its actual molecular weight.

The reaction temperature can vary over an extremely wide range, and optimum temperatures depend upon the concentration of catalyst present and the nature of the reactants. Often the reaction is initiated at a temperature considerably below room temperature, e. g. at 0°–10° C., and is highly exothermic once it has begun. The temperature should be one at which at least one of the reactants or a portion of the reaction mixture is in a mobile stage, i. e. liquid or gaseous. The maximum temperature is determined only by the stability of the reactants and the operator's desire to avoid decomposition products. Ordinarily it is best to keep the reaction below a temperature of about 300° C. Best results with most reactants are obtained by initiating the reaction at about 80° to 180° C., and maintaining the reaction within reasonable limits of this range. Of course the exothermic nature of the reaction often pushes the temperature up to, e. g., 200°–250° C. for a short time.

The optimum reaction time is a variable depending upon the reactants, reaction temperature, catalyst concentration, etc. Ordinarily there is no benefit in extending the contact time of the reactants beyond 16 or 17 hours, but there is likewise usually no harm in so doing unless an extremely elevated temperature is employed. With many reactants a practically quantitative yield of product is obtained in a contact time of 30 minutes or less, and often an excellent yield can be obtained as soon as the exothermic reaction has begun, i. e. in a matter of seconds.

The reaction can be carried out at atmospheric, subatmospheric, or superatmospheric pressures. Here again the choice of conditions is largely a matter of logic based upon the nature of the reactants and the equipment available. Non-volatile reactants are especially adaptable to being heated at atmospheric pressure, with or without a reflux arrangement. Reactants which are gaseous at ordinary temperatures are preferably reacted at substantially constant volume, e. g. under autogenous or induced pressure. As is usual with this type of reaction, best results are obtained by maintaining at least a portion of the reactants in the liquid phase.

In the following examples, which are illustrative only, all parts and percentages are by weight unless otherwise specified. Where isopropanol solutions of chloroplatinic acid are specified in the examples, a 0.1 molar solution was used unless otherwise specified.

*Example 1.*—This experiment illustrates the effect of different catalyst concentrations upon the reaction of this invention. Four solutions of chloroplatinic acid ($H_2PtCl_6 \cdot 6H_2O$) of $1 \times 10^{-1}$, $1 \times 10^{-2}$, $1 \times 10^{-3}$, and $1 \times 10^{-4}$ molar concentration were prepared with isopropyl alcohol as the solvent. A sufficient quantity of an equimolar mixture of methyldichlorosilane and pentene-1 was prepared to make the four runs described below. Reaction tubes were prepared from 25 mm. Pyrex tubing with thermocouple wells extending throughout the approximate center of each tube. Each tube was charged with a total of 39.5 g. of the equimolar mixture of pentene-1 and methyldichlorosilane (thus containing 0.214 mole of each of the reactants) and 0.1 ml. of one of the catalyst solutions. The tube was cooled in Dry Ice and sealed. A thermocouple connected to a recording potentiometer was inserted in one tube at a time and each such tube was placed inside a length of pipe which served as a safety shield. The pipe contained a small amount of mineral oil as a heat transfer medium and was both pre-heated and held in a steam bath at 100° C. Each tube in turn was placed within this heated pipe for 30 minutes and then removed and cooled. Yields of the amylmethyldichlorosilane product were determined by distillation. The results obtained from each of the four experiments, along with a control containing no catalyst, are indicated in the table below, where $T_1$ indicates the temperature at which extremely rapid exothermic reaction began, $T_2$ indicates the maximum temperature attained due to such exothermic reaction, and $\Delta T$ indicates the difference in these two temperatures. The yield is of pure product expressed in terms of percent of the theoretical yield based on either reactant, and is lower than actual yield due to handling losses.

| Moles Catalyst Per Mole Olefin | $T_1$ ° C. | $T_2$ ° C. | $\Delta T$ | Minutes to Reach Maximum Temp. | Yield |
|---|---|---|---|---|---|
| $5 \times 10^{-5}$ | 10 | 185 | 175 | <1 | 93.5 |
| $5 \times 10^{-6}$ | 30 | 200 | 170 | 1 | 93.0 |
| $5 \times 10^{-7}$ | 65 | 210 | 145 | 3 | 92.5 |
| $5 \times 10^{-8}$ | 70 | 170 | 100 | 6 | 81.5 |
| None | | 100 | | 15 | 0 |

The temperature $T_1$ was very obvious from the graph made by the recording potentiometer. It was indicated in each case, once the reaction began, by a slope which was practically vertical for a plot of the reaction temperature against time in minutes. The difference $\Delta T$ between the maximum temperature $T_2$ and the initial temperature $T_1$ at which rapid reaction began indicates the relative reaction rates better than does the maximum temperature attained.

*Example 2.*—An equimolar mixture of cyclohexane and methyldichlorosilane was heated overnight at 100° C. in the manner of Example 1 and in the presence of $2.5 \times 10^{-5}$ mole of chloroplatinic acid (isopropanol solution) per mole of the cyclohexene. Distillation of the reaction product showed a practically quantitative yield of cyclohexylmethyldichlorosilane. When the experiment was repeated using a catalyst consisting of Pt deposited on charcoal and present in an amount of $3 \times 10^{-6}$ mole Pt per mole cyclohexene, no reaction was obtained. When the concentration of Pt on charcoal was increased to $1 \times 10^{-3}$ moles Pt per mole cyclohexene, merely a trace of product (1–2% of theory) was obtained. The experiment was repeated employing platinum black as the catalyst at a concentration of $1 \times 10^{-3}$ mole Pt per mole cyclohexene, and a yield amounting to 20 percent of theoretical was obtained.

*Example 3.*—A mixture was prepared containing methyldichlorosilane and ethyl crotonate in a molar ratio of 1.5:1. Sufficient chloroplatinic acid (isopropanol solution) was added to this mixture to provide $3 \times 10^{-5}$ mole Pt per mole of the crotonate and the mixture was heated 16 hours at 100° C. as in Example 1. Distillation of the reaction product showed a 33 percent yield based on the starting silane of a silane product having a boiling point of 125° C. at 25 mm. Hg, $n_D^{25}$ 1.4322, $d_4^{25}$ 1.069.

*Example 4.*—An equimolar mixture of pentene-2 and methyldichlorosilane was heated for 30 minutes at 100°

C. in the manner of Example 1 in the presence of an isopropanol solution of chloroplatinic acid at a concentration of $3\times10^{-5}$ mole Pt per mole pentene. A practically quantitative yield of amylmethyldichlorosilane was obtained. This product gave every indication of being the n-amyl derivative in spite of the fact that pentene-2 had been employed as the reactant. When the experiment was repeated except that Pt deposited on charcoal was employed as the catalyst, no reaction was obtained even in 7 hours' reaction time. The experiment was repeated again employing the platinum-charcoal catalyst at a concentration of $1\times10^{-3}$ moles Pt per mole pentene and after a 17-hour reaction period a yield of 56 percent of theoretical was found.

*Example 5.*—A mixture was prepared containing methyldichlorosilane and methyl cis bicyclo[2.2.1]hept-5-ene-2 carboxylate,

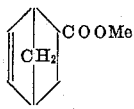

in the molar ratio of 1.25:1. This mixture was heated in the presence of sufficient chloroplatinic acid (isopropanol solution) to provide $3\times10^{-5}$ mole Pt per mole of the olefin. After a reaction period of three and one-half hours at 100° C., a reaction product was obtained by distillation amounting to 52 percent of the theoretical yield. The product had the following properties: boiling point 139° C./6 mm. Hg. $n_D^{25}$ 1.4912, $d_4^{25}$ 1.210, $R_D$ 0.2395 (calculated 0.2398), neutral equivalent 135 (calculated 134). Similar reactants such as

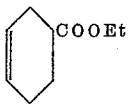

and

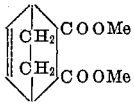

lead to comparable products. When the experiment was repeated with Pt deposited on charcoal as the catalyst no reaction was obtained.

*Example 6.*—An equimolar mixture of pentene-1 and trichlorosilane was heated for 30 minutes at 100° C. in the presence of sufficient chloroplatinic acid to provide $5\times10^{-6}$ mole Pt per mole pentene. The yield of amyltrichlorosilane was practically quantitative. This experiment was repeated using the platinum-charcoal catalyst and a yield of 70 percent of the theoretical was obtained.

*Example 7.*—A mixture of pentene-2 and trichlorosilane was reacted in the presence of an isopropanol solution of chloroplatinic acid in a concentration of $3\times10^{-5}$ mole Pt per mole pentene by heating the mixture 30 minutes in a sealed tube at 100° C. A practically quantitative yield of amyltrichlorosilane was obtained. The crude distilled product had a boiling point of 170° C. to 172° C. and an observed molar refraction of 0.2324 as compared with the calculated value of 0.2320 for n-amyltrichlorosilane. Again it appeared that a n-amyl product had been formed.

*Example 8.*—A mixture of 0.1 mole 3-butenyl acetate, 0.15 mole methyldichlorosilane and sufficient chloroplatinic acid in isopropanol to provide $1\times10^{-5}$ mole Pt per mole of olefin was heated in a sealed tube at a temperature of 100° C. for one hour. Distillation of the reaction product showed that 66 percent of the theoretical yield of $CH_3Cl_2Si(CH_2)_4OOCCH_3$ had been produced. This product had a boiling point of 135–6°/30 mm. Hg, $n_D^{25}$ 1.4441, $d_4^{25}$ 1.125, $R_D$ 0.236 (calculated value 0.238).

*Example 9.*—A mixture of 0.28 mole allylmethacrylate, 0.26 mole methyldichlorosilane, and sufficient chloroplatinic acid (isopropanol solution) to provide about $5\times10^{-6}$ mole Pt per mole olefin was heated for 30 minutes at 85° C. The temperature started to rise rapidly at this point and the flask was cooled, thus keeping the maximum temperature attained to 110° C. The flask was cooled until it reached room temperature and the reaction product was distilled. The reaction was stopped in this manner to avoid polymerization of the methacrylate portion of the product which was expected. Distillation showed that 19 percent of the theoretical yield of $CH_3Cl_2Si(CH_2)_3OOC(CH_3)C=CH_2$ had been formed. This product had a boiling point of 75° C./2 mm. Hg, $n_D^{25}$ 1.4552, $d_4^{25}$ 1.108, observed $R_D$ 0.2448 as compared to a calculated value of 0.2430. The neutral equivalent of this product was found to be 128 as compared to the theoretical value of 120.6.

*Example 10.*—A mixture of 0.6 part $[(CH_3)HSiO]_4$ 1.7 parts

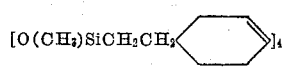

and sufficient chloroplatinic acid in isopropanol to provide $3\times10^{-6}$ mole Pt per equivalent of the unsaturated reactant were mixed. The resulting colorless homogeneous solution was heated in an open container at 120° C. and formed a clear hard transparent polymer. When the experiment was repeated employing a reaction temperature of 95° C., a similar product was obtained.

The siloxane reactant

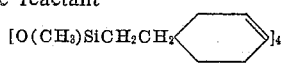

mentioned above can be prepared by hydrolyzing the compound

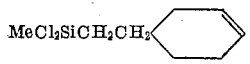

The latter compound can be prepared by reacting 4-vinylcyclohexene with $MeHSiCl_2$, in the presence of platinum precipitated on charcoal as the catalyst, at about 100°–135° C. Under these conditions the Si—H adds selectively to the vinyl group and the cyclohexenyl radical is left in its original unsaturated condition.

*Example 11.*—A mixture of 2.4 parts $(CH_3HSiO)_4$ 3.1 parts styrene and .65 part divinylbenzene was heated with sufficient chloroplatinic acid in isopropanol to provide $2\times10^{-6}$ mole Pt per equivalent of ethylenic unsaturation. The reaction temperature employed was 90° C. and a viscous fluid product was obtained. This experiment was repeated employing the same amount of siloxane and 2.1 parts styrene along with 1.3 parts divinylbenzene. The product was a dry gel of excellent clarity but of little physical strength.

*Example 12.*—A mixture of 3 parts $(CH_3HSiO)_4$ (0.05 equivalent Si—H), 2.5 parts diallylphthalate (0.05 equivalent of ethylenic unsaturation) and chloroplatinic acid (isopropanol solution) in an amount sufficient to provide $5\times10^{-6}$ mole Pt per mole olefin was heated at 95° C. for 30 minutes. This produced a solid clear resinous product. The experiment was repeated at 150° C., and a foamed resin was produced due to the evolution of propylene during polymerization. When the diallylphthalate was replaced in this experiment with triallyl cyanurate, a foamed resin was produced when the reaction was initiated at 50° C.

*Example 13.*—A mixture of 815 g. (6 mols) of trichlorosilane and chloroplatinic acid hexahydrate in amount to give .001639 g. of platinum were placed in an autoclave. Ethylene was then added under pressure in amount in excess of 6 mols and the bomb was heated at about 135° C. for 2½ hours. The reaction product was found to contain a 100% yield of ethyltrichlorosilane based upon the amount of trichlorosilane employed. Replacing the trichlorosilane with tribromosilane leads to the production of ethyltribromosilane.

*Example 14.*—A mixture of 300 g. of allyl acetate, 531 g. of phenyldichlorosilane and 3 cc. of a 10% solution of chloroplatinic acid hexahydrate in the dimethylether of diethylene glycol was heated in an autoclave at 130° C. for 5 hours. The product was MeCOOCH$_2$CH$_2$CH$_2$SiPhCl$_2$, B. P. 153° C. at 4 mm., $n_D^{25}$ 1.5107, $d_4^{25}$ 1.188, $R_D$ 0.2517, calc'd. $R_D$ 0.2513, neut. eq. 139, calc'd. neut. eq. 138.5.

*Example 15.*—A mixture of 165 g. of dichlorostyrene, 575 g. of dimethylchlorosilane and 3 cc. of the catalyst solution of Example 14 was heated in an autoclave at 100° C. for 4 hours. The product was distilled and there was obtained (dichlorostyryl)dimethylchlorosilane, boiling 93–97° C. at 1 mm.

*Example 16.*—A mixture of 815 g. of trichlorosilane, 162 g. of propylene and .167 g. of chloroplatinic acid hexahydrate, added as a solution in the dimethylether of diethylene glycol, was heated in an autoclave at 150–170° C. for 5 hours. The residue was examined by infrared analysis and found to contain 76% of the theoretical amount of n-propyltrichlorosilane. Similar results were obtained by using an anhydrous form of the catalyst.

*Example 17.*—A copolymer containing 75 molar percent C$_6$H$_5$CH$_3$SiO units and 25 molar percent $$C_6H_5(CH_2=CH)SiO$$

units was prepared. 10 g. of this copolymer (containing 0.0189 equivalent of vinyl groups) was mixed with 1.14 g. of (CH$_3$HSiO)$_6$ (containing 0.0189 equivalent of Si—H) and 0.02 g. of a dimethylether of propylene glycol solution containing 0.11 percent chloroplatinic acid. The mixture was heated for 25 hours at 150° C., and the product obtained was a clear tough gel, formed by the addition of Si—H to SiCH=CH$_2$.

*Example 18.*—An equimolar mixture of allyl cyanide and methyldichlorosilane was heated for two hours at a temperature ranging from 80° to 120° C. in the presence of chloroplatinic acid in a quantity sufficient to provide 1×10$^{-6}$ mole Pt per equivalent of ethylenic groups. The reaction product was distilled and a 70 percent yield of CH$_3$Cl$_2$Si(CH$_2$)$_3$CN was obtained based upon the theoretical yield. The distilled product boiled at 132° C./25 mm. Hg and had the following properties: $d_4^{25}$ 1.145, $n_D^{25}$ 1.4551, $R_D$ 0.2370 (calculated value 0.2366), neutral equivalent 92.8 (calculated 91.0).

*Example 19.*—A mixture of (Me$_2$HSi)$_2$O and 3-butenyl acetate in the molar ratio of 1.5 to 1 was heated for 24 hours at 100° C. in the presence of sufficient chloroplatinic acid to provide 5×10$^{-3}$ mole Pt per mole of the acetate. Distillation of the reaction product showed that two compounds had been formed in almost equal amounts, i. e.

$$Me_2SiHOSiMe_2—(CH_2)_4OAc$$

(B. P. 105–119° C./4 mm. Hg, $d_4^{25}$ 0.932, $n_D^{25}$ 1.4120) and $$O[SiMe_2(CH_2)_4OAc]_2$$

(B. P. 164–175° C./3 mm. Hg, $d_4^{25}$ 0.960, $n_D^{25}$ 1.4246, $R_D$ 0.2661).

*Example 20.*—A mixture of 1150 g. (10 moles) methyldichlorosilane and 500 g. (5.81 moles) methyl acrylate was heated for 16 hours at 120° to 125° C. in a three-liter nickel plated bomb and in the presence of sufficient chloroplatinic acid to provide 5×10$^{-5}$ mole Pt per mole of the acrylate. Distillation of the reaction product showed that a 52 percent yield, based upon the theoretical yield, of two isomers had been obtained. One isomer was the compound MeCl$_2$SiCHCH$_3$COOMe, which boiled at 80° to 80.5° C./25 mm. Hg and had the following properties: $n_D^{25}$ 1.4382, $d_4^{25}$ 1.173, neutral equivalent 100.9 (calculated value 100.6). The other isomer was the compound MeCl$_2$SiCH$_2$CH$_2$COOMe, having a boiling point of 98.5° C./25 mm. Hg, $n_D^{25}$ 1.4439, $d_4^{25}$ 1.187, neutral equivalent 101.1 (calculated 100.6).

*Example 21.*—Acetylene was introduced into a bomb containing triacetoxysilane and sufficient chloroplatinic acid (isopropanol solution) to provide 5×10$^{-6}$ mole Pt per mole of the silane. The mixture was heated at 100° C. for 2 hours and the reaction product was found to be vinyl triacetoxysilane.

*Example 22.*—When vinyl chloride, butadiene, methyl oleate, isobutylene or butyne are heated with methyldichlorosilane in the presence of chloroplatinic acid in the manner of Example 18, the corresponding reaction takes place.

*Example 23.*—When methyldiethoxysilane is reacted with ethylene in the maner of Example 13, methylethyldiethoxysilane is produced. When MeH$_2$SiCl is employed as the silane in the same reaction, the product obtained is methyldiethylchlorosilane. When the silane reactant is butyldichlorosilane the product obtained is ethylbutyldichlorosilane.

*Example 24.*—A mixture of one mole of methyl methacrylate and 0.25 mole methyldichlorosilane was heated under reflux in the presence of 1×10$^{-4}$ mole of chloroplatinic acid (as a solution in isopropanol). A further amount of 0.75 mole methyldichlorosilane was added to the refluxing mixture over a period of one hour. The temperature during this addition ranged from 80° to 110° C. The reaction product was distilled to give 50 percent of the theoretical yield of the compound $$MeCl_2SiCH_2CHMeCOOMe,$$

which had the following properties: B. P. 101° C./25 mm. Hg, $n_D^{25}$ 1.4434, $d_4^{25}$ 1.155, $R_D$ 0.2297 (calculated 0.2315).

*Example 25.*—A mixture of vinyl acetate and methyldichlorosilane in the molar ratio of 2 to 1 was refluxed 23 hours in the presence of sufficient chloroplatinic acid (isopropanol solution) to provide 2×10$^{-5}$ moles Pt per mole of the acetate. The temperature during this period ranged from 58° to 130° C. Distillation of the reaction product showed an 82 percent yield (based on the theoretical yield) of the compound MeCl$_2$SiC$_2$H$_4$OAc, having the following properties: B. P. 118° C./60 mm. Hg, $n_D^{25}$ 1.4390, $d_4^{25}$ 1.178, $R_D$ 0.2333, neutral equivalent 100.1 (calculated 100.5). This reaction was attempted under identical conditions with the exception that platinum deposited on charcoal was employed as the catalyst. Although the same concentration of Pt was present in this second experiment, no reaction was obtained.

*Example 26.*—A copolymer containing 95 molar percent of dimethylsiloxane units and 5 molar percent of methylvinylsiloxane units was mixed with a methylhydrogensiloxane homopolymer in an amount such that equivalent amounts of Si—H and vinyl groups were present. An isopropanol solution of chloroplatinic acid, in amount to provide 5×10$^{-6}$ mole Pt per equivalent of vinyl groups, was thoroughly dispersed in the mixture. A sample of this liquid homogeneous mixture became a rubbery copolymer upon standing at room temperature for a few days. Another sample was converted to a rubbery product in one hour by heating it at 150° C.

*Example 27.*—When a mixture of 326 parts trichlorosilane, 194 parts *Hevea braziliensis* (a ratio of about 1 molecule silane per double bond) in the form of smoked sheet, 375 parts benzene, and sufficient chloroplatinic acid to provide 1×10$^{-4}$ mole Pt per equivalent of double bond is heated in an autoclave at about 250° C. for 16 hours, a trichlorosilyl substituted rubber is obtained. A similar product is obtained when GR-S type rubber (75 butadiene—25 styrene copolymer) is substituted for the natural rubber in this reaction.

The products of this invention vary from volatile monomers through viscous liquids and rubbery polymers to hard insoluble and infusible resins. Depending on the nature of the particular product, they are capable of all the vast number of well known uses typical of the organosilicon compounds in general, e. g., as hydraulic fluids, lubricating compounds, electrical insulating resins and rubbers, molding compounds, impregnating and structural resins, etc. Those products which retain hydrolyzable radicals can be hydrolyzed to form initial or additional siloxane bonds and thus to form further products capable of the conventional uses of organosiloxanes. Those products which retain functional organic substitution can be used as intermediates in further reactions making use of the functional nature of such organic groups in manners which have been amply described in the literature.

*Example 28.*—A copolymer was prepared containing, in terms of molar percentages, the following polymeric siloxane units: 50 PhEtSiO, 10 $Me_3SiO_{.5}$, 5 $SiO_2$, 5 $Cl_2C_6H_3SiO_{1.5}$, 5 cyclohexylsiloxane, 5 benzylmethylsiloxane, 5 $ViSiO_{1.5}$, 5 $Me_2ViSiO_{.5}$, and 10 cyclohexenylmethylsiloxane. This copolymer was prepared by adding a mixture of the corresponding chlorosilanes to an excess of the theoretical amount of water containing 25 percent of the theoretical equivalent of isopropanol. The hydrolyzate was taken into solution in toluene, and after being washed until the wash water contained no acid, it was substantially stripped of solvent and found to contain small amounts of residual silicon linked chlorine atoms, isopropoxy radicals, and hydroxy groups. Another copolymer was prepared in a similar manner from a mixture containing 50 molar percent $PhMeSiCl_2$, 25 molar percent $HSiCl_3$, and 25 molar percent $MeHSiCl_2$. When the two copolymers are mixed in proportions such that the Si—H content of the one is approximately equivalent to the amount of aliphatic and alicyclic unsaturation in the other, along with sufficient chloroplatinic acid to provide $1 \times 10^{-4}$ mole Pt per mole of Si—H, warming a toluene solution thereof at 80° C. results in an increase in the degree of polymerization due to addition across the double bonds, so that an extremely high molecular weight resin is produced.

That which is claimed is:

1. A process for the production of organosilicon compounds containing the carbon to silicon bond comprising contacting a silicon compound containing at least one H atom linked to Si per molecule, there being not more than two H atoms attached to any one Si atom, with a compound containing aliphatic carbon atoms linked by multiple bonds in the presence of a chloroplatinic acid.

2. A process for the production of organosilicon compounds containing the carbon to silicon bond comprising contacting a silicon compound selected from the group consisting of (1) silicon compounds having the formula $R_xSiH_zY_{4-x-z}$ where R is a monovalent hydrocarbon radical, Y is selected from the group consisting of halogen atoms, —OR' radicals and —OOCR' radicals where R' is a monovalent hydrocarbon radical, $x$ has a value of from 0 to 2 inclusive, and $z$ has a value of from 1 to 2 inclusive, and (2) hydrolysis products of (1) which retain at least one H atom linked to Si per molecule, with a compound containing aliphatic carbon atoms linked by multiple bonds, in the presence of chloroplatinic acid.

3. A process for the production of organosilicon compounds containing the carbon to silicon bond comprising contacting a silicon compound selected from the group consisting of (1) silicon compounds having the formula $R_xSiH_zY_{4-x-z}$ where R is a monovalent hydrocarbon radical, Y is selected from the group consisting of halogen atoms, —OR' radicals and —OOCR' radicals where R' is a monovalent hydrocarbon radical, $x$ has a value of from 0 to 2 inclusive, and $z$ has a value of from 1 to 2 inclusive, and (2) hydrolysis products of (1) which retain at least one H atom linked to Si per molecule, with a hydrocarbon containing aliphatic unsaturation, in the presence of chloroplatinic acid in a concentration of at least $1 \times 10^{-8}$ mole of said acid per equivalent of aliphatic unsaturation.

4. A process for the production of organosilicon compounds containing the carbon to silicon bond comprising contacting a silicon compound selected from the group consisting of (1) silicon compounds having the formula $R_xSiH_zY_{4-x-z}$ where R is a monovalent hydrocarbon radical, Y is selected from the group consisting of halogen atoms, —OR' radicals and —OOCR' radicals where R' is a monovalent hydrocarbon radical, $x$ has a value of from 0 to 2 inclusive, and $z$ has a value of from 1 to 2 inclusive, and (2) hydrolysis products of (1) which retain at least one H atom linked to Si per molecule, with an organosilicon compound containing at least one R'' radical attached directly to silicon by carbon to silicon linkage per molecule, said R'' radical being a monovalent hydrocarbon radical containing aliphatic unsaturation, in the presence of chloroplatinic acid in a concentration of at least $1 \times 10^{-8}$ mole of said acid per equivalent of said R'' radicals.

5. A process in accordance with claim 4 wherein the R''-containing organosilicon compound is an organosiloxane polymer containing at least one polymeric unit of the formula $R''R_xSiO_{(3-x)/2}$ per molecule, where R, R'', and $x$ are as defined in claim 4.

6. In a process for the production of organosilicon compounds containing the carbon to silicon bond by the reaction of a silicon compound containing at least one H atom linked to Si per molecule, there being not more than two H atoms on any one Si atom, with a compound containing aliphatic carbon atoms linked by multiple bonds, the improvement which comprises contacting the reactants in the presence of chloroplatinic acid.

7. A process for the production of organosilicon compounds containing a carbon to silicon bond comprising contacting a compound of the formula $(CH_3)_xSiHCl_{3-x}$, where $x$ is an integer of from 0 to 2 inclusive, with an unsaturated compound containing aliphatic carbon atoms linked by multiple bonds selected from the group consisting of alkenes, cycloalkenes, alkynes, alkenyl cyanides, and unsaturated organic esters of a carboxylic acid and an alcohol, in the presence of sufficient chloroplatinic acid to provide at least $1 \times 10^{-8}$ mole of said acid per equivalent of the unsaturated compound.

8. A process for the production of polymeric organosiloxanes comprising contacting an organosiloxane polymer in which there is at least one polymeric unit of the formula $$R_xViSiO_{\frac{3-x}{2}}$$

per molecule, where R is selected from the group consisting of methyl and phenyl radicals, Vi is a vinyl radical, and $x$ is an integer of from 0 to 2 inclusive, with an organosiloxane polymer containing at least one unit of the formula $$(CH_3)_qHSiO_{\frac{3-q}{2}}$$

per molecule, where $q$ is an integer of from 0 to 1 inclusive, in the presence of sufficient chloroplatinic acid to provide at least $1 \times 10^{-8}$ mole of said acid per equivalent of Vi radicals.

9. A process for increasing the degree of polymerization of a polymerized dimethylsiloxane which comprises contacting a copolymer consisting essentially of dimethylsiloxane units and methylvinylsiloxane units, there being at least one molar percent of the latter units in the copolymer, with a copolymer consisting essentially of methylhydrogensiloxane units, in the presence of chloroplatinic acid.

References Cited in the file of this patent

UNITED STATES PATENTS

| | | |
|---|---|---|
| 2,632,013 | Wagner et al. | Mar. 17, 1953 |
| 2,637,738 | Wagner | May 5, 1953 |

FOREIGN PATENTS

| | | |
|---|---|---|
| 684,597 | Great Britain | Dec. 24, 1952 |
| 916,529 | Germany | Aug. 12, 1954 |